United States Patent
Liu et al.

(10) Patent No.: US 11,257,520 B1
(45) Date of Patent: Feb. 22, 2022

(54) VARIABLE HARD DISC DRIVE IDLE SPINDLE SPEEDS WITHIN A DISC ARRAY

(71) Applicant: Seagate Technology LLC, Fremont, CA (US)

(72) Inventors: Xiong Liu, Singapore (SG); Li Hong Zhang, Singapore (SG)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 17/090,684

(22) Filed: Nov. 5, 2020

(51) Int. Cl.
*G11B 19/20* (2006.01)
*G11B 33/12* (2006.01)
*G11B 19/28* (2006.01)

(52) U.S. Cl.
CPC ............ *G11B 19/209* (2013.01); *G11B 19/28* (2013.01); *G11B 33/125* (2013.01); *G11B 19/2054* (2013.01); *G11B 19/2063* (2013.01); *G11B 19/2072* (2013.01)

(58) Field of Classification Search
None
See application file for complete search history.

(56) References Cited

U.S. PATENT DOCUMENTS

| | | | | |
|---|---|---|---|---|
| 6,134,069 A | * | 10/2000 | Catalano | G11B 19/20 360/73.03 |
| 6,891,781 B2 | | 5/2005 | Kadlec et al. | |
| 6,934,107 B2 | * | 8/2005 | Escobar | G11B 5/40 360/69 |
| 7,002,884 B2 | | 2/2006 | Schmidt et al. | |
| 7,134,011 B2 | | 11/2006 | Fung | |
| 8,745,327 B1 | * | 6/2014 | Throop | G06F 3/0689 711/114 |
| 2003/0126158 A1 | * | 7/2003 | Chainer | G11B 5/4976 |
| 2005/0160221 A1 | * | 7/2005 | Yamazaki | G06F 3/0625 711/114 |
| 2005/0268132 A1 | * | 12/2005 | Yun | G11B 19/28 713/323 |
| 2007/0146924 A1 | * | 6/2007 | Nishioka | G11B 5/54 360/75 |
| 2011/0185201 A1 | * | 7/2011 | Kawakami | G11B 19/209 713/320 |
| 2011/0264854 A1 | * | 10/2011 | Ouchi | G06F 3/0616 711/114 |
| 2012/0023292 A1 | * | 1/2012 | Saito | G06F 3/0665 711/114 |
| 2018/0225172 A1 | * | 8/2018 | Arslan | G06F 3/0653 |

\* cited by examiner

*Primary Examiner* — Tan X Dinh
(74) *Attorney, Agent, or Firm* — Holzer Patel Drennan

(57) ABSTRACT

A data storage rack may only have a subset of the HDDs therein operating in an active mode where read/write operations may be performed. Other HDDs may operate in an idle mode, which is a power-saving state that permits the HDDs to quickly change-over to the active mode, when needed. In storage racks containing numerous HDDs, a majority of the HDDs may be operated at idle mode for a majority of the time. Where a large number of HDDs are operated at idle mode, a fixed common idle speed shared by the numerous HDDs can cause unwanted excitation, vibration, and resonance. This can yield increased wear on rack components, decreased performance from the HDDs therein, and increased noise. Variable HDD idle spindle speeds mitigate the foregoing, which is caused by an idle spindle speed previously common to many, if not all HDDs within the data storage rack.

20 Claims, 4 Drawing Sheets

VARIABLE HARD DISC DRIVE IDLE SPINDLE SPEEDS WITHIN A DISC ARRAY

BACKGROUND

Growing use of cloud-based storage solutions has driven demand for low-cost data storage systems capable of retaining large volumes of data. Various implementations of these cloud-based storage solutions may utilize combinations of multiple hard disc drives (HDDs) known as disc arrays. One or more of the disc arrays may be arranged within a storage rack. While disc arrays may contain multiple HDDs, the disc arrays have common functionality used across the multiple HDDs, such as cache memory, and advanced functionalities (e.g., RAID, deduplication, encryption, and virtualization). A disc array operated using a common cache memory may elect to only have a subset of the HDDs therein operating in an active mode where read/write operations may be performed. Other HDDs within the array may operate in an idle mode, which is a power-saving state that permits the HDDs to quickly change-over to the active mode, when needed. Typically, HDDs are set at the factory to operate at a fixed idle mode spindle speed and a fixed active mode spindle speed. In storage racks containing numerous disc arrays, each of which may contain numerous HDDs, a majority of the HDDs may be operated at idle mode for a majority of the time.

SUMMARY

Implementations described and claimed herein address the foregoing problems by providing a disc array comprising a first hard disc drive to selectively operate at one of a first active mode spindle speed and a first idle mode spindle speed and a second hard disc drive to selectively operate at one of a second active mode spindle speed and a second idle mode spindle speed. The first idle mode spindle speed is different from the second idle mode spindle speed.

Implementations described and claimed herein address the foregoing problems by further providing a method of defining idle mode spindle speeds for a disc array comprising assigning a first idle mode spindle speed within a selection range to a first hard disc drive, and assigning a second idle mode spindle speed within the selection range to a second hard disc drive. The first idle mode spindle speed is different from the second idle mode spindle speed.

Implementations described and claimed herein address the foregoing problems by still further providing a data storage rack comprising a first disc array and a second disc array. The first disc array includes a first hard disc drive to selectively operate at one of a first active mode spindle speed and a first idle mode spindle speed, and a second hard disc drive to selectively operate at one of a second active mode spindle speed and a second idle mode spindle speed. The second disc array includes a third hard disc drive to selectively operate at one of a third active mode spindle speed and a third idle mode spindle speed, and a fourth hard disc drive to selectively operate at one of a fourth active mode spindle speed and a fourth idle mode spindle speed. The first, second, third, and fourth idle mode spindle speeds are different.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

Where a large number of hard disc drives (HDDs) within a disc array and/or a data storage rack are operated at idle mode for a time period, a fixed common idle speed shared by the numerous HDDs can cause unwanted excitation, vibration, and resonance within the disc array and/or the data storage rack. This can yield increased wear on rack components, including but not limited to the HDDs themselves, decreased performance from the disc arrays and HDDs therein, and increased noise (e.g., pure discrete tune (PDT)) generated by the data storage rack. The following describes variable HDD idle spindle speeds for the purpose of mitigating the foregoing, which is caused by an idle spindle speed previously common to many, if not all HDDs within the disc array and/or the data storage rack.

Figure 1:
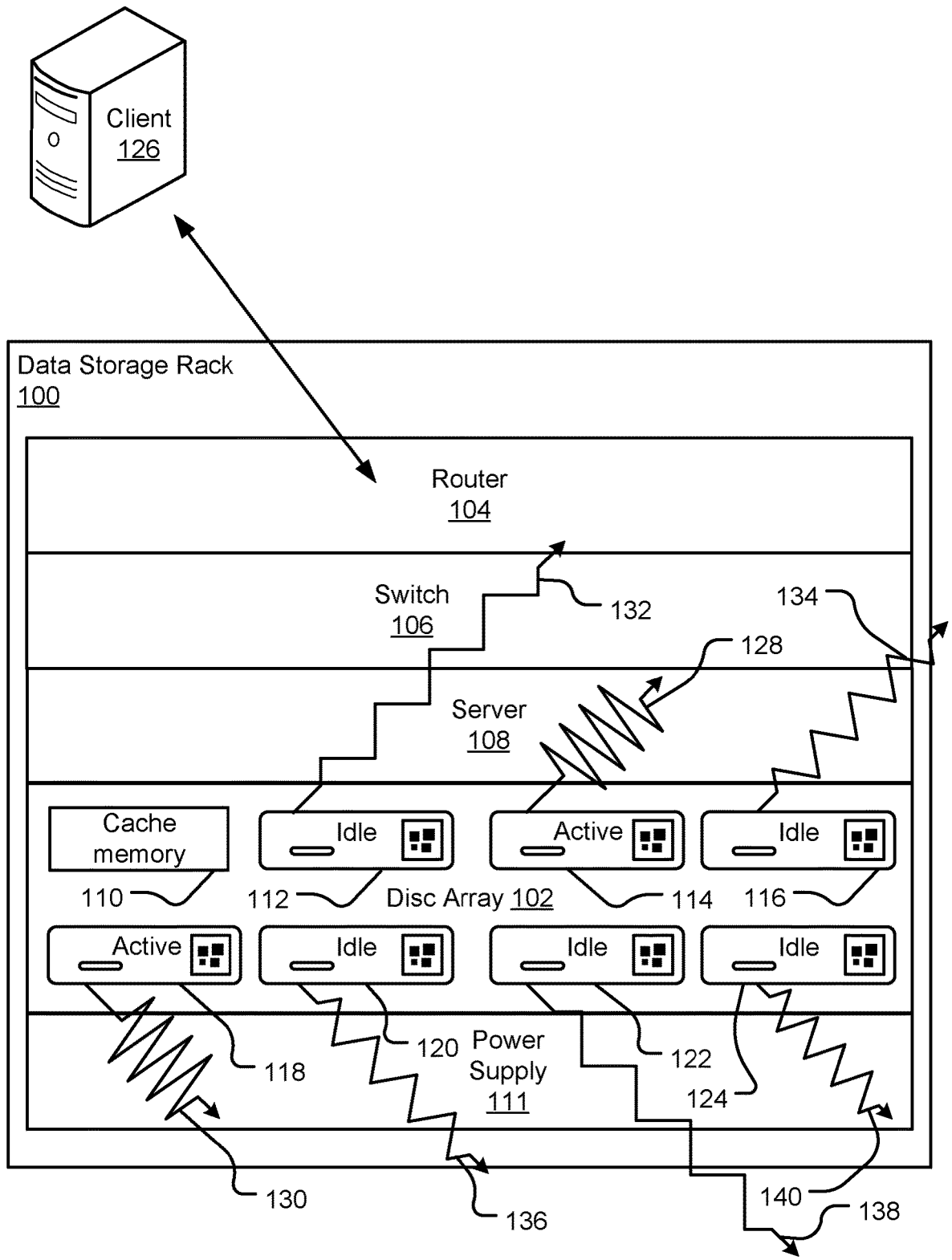
FIG. 1 illustrates a data storage rack containing a disc array within hard disc drives (HDDs) operating at variable idle speeds.

FIG. 1 illustrates a data storage rack 100 containing a disc array 102 with seven hard disc drives (HDDs) 112, 114, 116, 118, 120, 122, 124 operating at variable idle speeds. The data storage rack 100 forms a structural framework for mounting a variety of information technology (IT) equipment. One or several data storage racks, such as data storage rack 100, are used within a variety of business and entities to house equipment to meet their IT needs. Numerous data storage racks, such as data storage rack 100 are commonly used within data centers for cloud computing data storage.

Data storage racks are commonly designed to accommodate a common physical size and shape format for the IT equipment. Accordingly, a variety of IT equipment may be located within the data storage rack 100 to meet its intended purpose. For example, data storage rack 100 includes a router 104 that serves to direct data flow to and from the data storage rack 100 and a server 108 to run programs and/or provide functionality for external devices, such as client 126 (in a client—server model). The server 108 can provide various functionalities, referred to herein as services, such as retrieving requested data for the client 126 or storing incoming data from the client 126. The server 108 may also share data or resources among clients or perform computations for the client 126. While only one client 126 is depicted, in many implementations, the server 108 will provide access to resources within the rack 100, such as the disc array 102, and various functionalities to multiple clients.

The disc array 102 includes HDDs 112, 114, 116, 118, 120, 122, 124, the whole of which is used to store and retrieve data as directed by the server 108. The disc array 102 includes a common cache memory 110, and therefor may elect to only have a subset of the HDDs therein operating in an active mode where incoming read/write requests by the server 108 for outgoing/incoming data may be performed. Here, HDDs 114, 118 are illustrated as operating in an active mode, making the HDDs 114, 118 eligible as one or both of a recipient of the incoming data to the disc array 102 and a source of the outgoing data from the disc array 102. The active mode yields a high spindle speed and associated vibration, as illustrated by arrows 128, 130, respectively. As a relatively small number of HDDs are operated in active mode at any point in time (here, illustrated as two HDDs 114, 118), the associated vibration caused by the relatively small number of HDDs operated in active mode may be disregarded. In other implementations, HDDs with different active mode spindle speeds may be selected to populate the disc array 102 and/or the data storage rack 100 to minimize resonance between multiple HDDs operated in active mode. A relatively small number of HDDs operated in active mode at any point in time as contemplated herein may range from 10%-30% of the total HDDs within the disc array 102, or within the data storage rack 100 overall.

The other HDDs 112, 116, 120, 122, 124 within the disc array 102 operate in an idle mode, which is a power-saving state that permits the HDDs to quickly switch to the active mode, when needed. The HDDs 112, 116, 120, 122, 124 are illustrated as operating in the idle mode, which yields low spindle speeds and associated vibration, as illustrated by arrows 132, 134, 136, 138, 140, respectively. As a relatively large number of HDDs are operated in idle mode at any point in time (here, illustrated as five HDDs 112, 116, 120, 122, 124), the associated vibration caused by the relatively large number of HDDs operated in idle mode is significant. A relatively large number of HDDs operated in idle mode at any point in time as contemplated herein may range from 70%-90% of the total HDDs within the disc array 102, or within the data storage rack 100 overall.

The vibration frequency and magnitude may vary across the HDDs 112, 116, 120, 122, 124, as illustrated by the varied sizes of the arrows 132, 134, 136, 138, 140, respectively. The varied vibrations are caused by varying the low spindle speeds amongst the HDDs 112, 116, 120, 122, 124. In some implementations, the spindle speeds amongst the HDDs 112, 116, 120, 122, 124 are all different, but lying within a preselected range for spindle speed in idle mode operation. In other implementations, the spindle speeds amongst the HDDs 112, 116, 120, 122, 124 vary amongst a fixed number of preselected speed choices for the spindle speed in idle mode operation. In either implementation, the HDDs 112, 116, 120, 122, 124 are prevented from sharing a common spindle speed in idle mode operation, which further prevents or reduces the incidence and/or magnitude of resonant vibration caused by the HDDs 112, 116, 120, 122, 124 as a whole. While the disc array 102 is illustrated as containing seven HDDs 112, 114, 116, 118, 120, 122, 124, other disc arrays may contain any number of HDDs within the physical limitations of the disc array 102. Further, while the data storage rack 100 is illustrated as containing a singular disc array 102, other data storage racks may contain any number of disc arrays within the physical limitations of the data storage rack 100.

The data storage rack 100 further includes a network switch 106 that serves to interconnect the IT equipment within the data storage rack 100 and a power supply 111 to receive and convert incoming power to a voltage, current, and frequency appropriate to power the IT equipment within the data storage rack 100. In various implementations, the data storage rack 100 may include greater or fewer of the IT equipment shown in FIG. 1 and described herein. Further, the data storage rack 100 may include multiples of any of the IT equipment shown in FIG. 1 and described herein. Depending upon the intended use of the data storage rack 100, the size, appearance, and arrangement of the rack 100 and the IT equipment housed therein may vary widely from that shown in FIG. 1 and described herein. In some implementations, the disc array 102 contains storage magazines and cartridges. More specifically, HDDs 112, 116, 120, 122, 124 may take the form of cartridges and fill a magazine, and the magazine, as well as additional similar or dissimilar magazines, fill the disc array 102.

Figure 2:
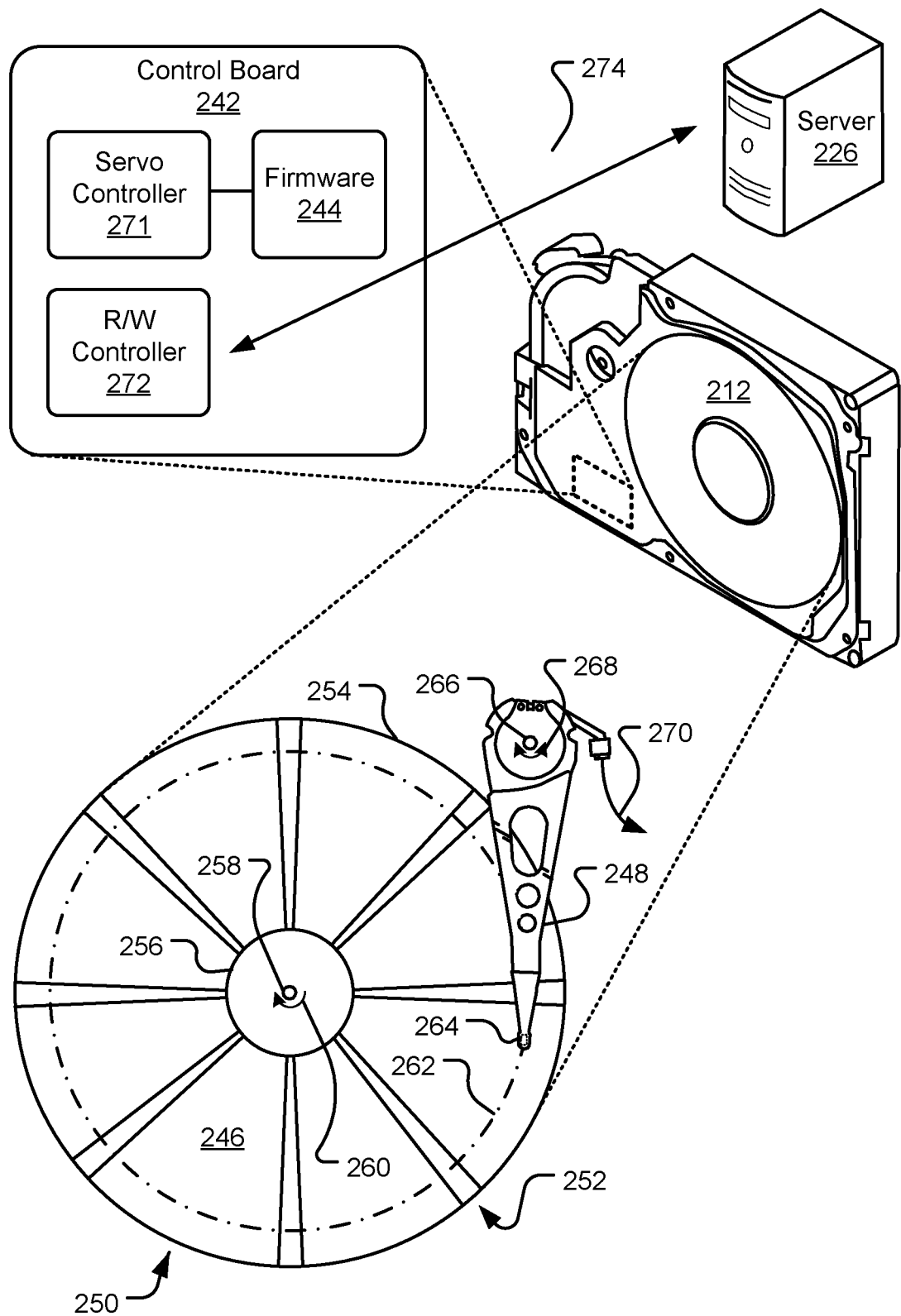
FIG. 2 illustrates an example hard disc drive (HDD) including a control board having access to firmware programmed with an idle speed selected from multiple options within a selection range.

FIG. 2 illustrates an example hard disc drive (HDD) 212 including a control board 242 having access to firmware 244 programmed with an idle speed selected from multiple options within a selection range. The HDD 212 is illustrated overall by its enclosure, with one or more storage platters (or discs) and associated actuator arms therein. Though not normally visible, storage platter 246 and associated actuator arm 248 are illustrated below the HDD 212 for clarity.

The storage platter 246 includes a series of spaced servo wedges (e.g., servo wedge 252) and data wedges (e.g., data wedge 250) within an outer diameter 254 and an inner diameter 256 of the storage platter 246, between which are a number of substantially circular concentric data tracks making up an entirety of the readable and/or writable surface area of the storage platter 246. Specific locations on the storage platter 246 may be defined by any available addressing scheme (e.g., cylinder-head-sector (CHS) addressing and logical block addressing (LBA) schemes). The storage platter 246 rotates at high speed about platter spindle 258 (as illustrated by arrow 260) in an active mode as information is written to and/or read from data tracks (e.g., track 262) within the data wedges on the storage platter 246. The storage platter 246 rotates at low speed about platter spindle 258 in an idle mode where information is not actively being written to and/or read from the data tracks within the data wedges on the storage platter 246.

In the active mode, information may be written to and read from the storage platter 246 via the actuator arm 248 and its respective slider 264. More specifically, the actuator arm 248 pivots about actuator spindle 266 using a servo motor (or voice-coil motor (VCM), not shown) during a seek operation to locate the data track 262 on the storage platter 246, as illustrated by arrow 268. The actuator arm 248 extends toward the storage platter 246 and the slider 264 is located at an end of the actuator arm 248 distal from the actuator spindle 266. The slider 264 flies in close proximity above the storage platter 246 while the storage platter 246 rotates about the platter spindle 258.

The storage platter 246 includes an array of embedded independent magnetic domains and the slider 264 includes an array of microelectronic components (e.g., a read element, a write element, thermal actuators, other head-media spacing micro-actuators, etc., not shown). The read elements are magneto-resistive, which allows them to read data from the magnetic domains as they pass underneath the read element. The write elements generate magnetic fields that selectively change polarity of the magnetic domains of the storage platter 246 as they pass underneath the write elements, which allows the write elements to write data to the storage platter 246. A flex cable 270 provides electrical connection paths from control board 242 (e.g., a controller SoC) to the various microelectronic components attached to the actuator arm 248 and the slider 264. The flex cable 270 transmits data signals from the read elements and/or to the write elements, while allowing pivotal movement of the actuator arm 248 during operation of the HDD 212.

By example and without limitation, the control board 242 includes a servo controller 271, a read/write (R/W) controller 272, and firmware 244. The control board 242 is intended to represent a collection of hardware and software elements, including for example control instructions executed by one or more separate or shared device controllers (e.g., microprocessors), peripheral interface controllers (PICs), application-specific integrated circuits (ASICs), systems on chips (SoCs), etc.

The servo controller 271 directs various operations of the HDD 212, including but not limited to operation of a first VCM controlling the platter spindle 258 to control rotation of the storage platter 246 and operation of a second VCM controlling the actuator spindle 266 to control rotation of the actuator arm 248. The R/W controller 272 executes read and write commands received from a server 226 (e.g., a system host or client), as illustrated by arrow 274, on the HDD 212. For example, the R/W controller 272 may open a read/write channel, select a preamplifier and configure preamplifier settings for R/W operations, and/or control other electronics that facilitate power and data access (e.g., read/write access) to the HDD 212. The servo controller 271 may control actuator spindle 266 movement for positioning the slider 264, spin up or down the platter spindle 258, and/or controllably actuate one or more voice coil motors (VCM) within the HDD 212.

The servo controller 271 may select whether the platter spindle 258 is off (e.g., the HDD 212 is in a standby mode with the slider 264 parked), the storage platter 246 is spinning at a low speed (e.g., the HDD 212 in an idle mode with the slider 264 parked or flying above the storage platter 246), or the storage platter 246 is spinning at a high speed (e.g., the HDD 212 in an active mode with the slider 264 parked or flying above the storage platter 246).

Standby mode is used when the HDD 212 is transitioning to or from a power-off condition, or example. The storage platter 246 is not spinning and the slider 264 is parked. In some implementations, standby mode may be used for an extended period when the HDD 212 is powered-on, but not expected to be used in R/W operations in the short term. Active mode is used when the HDD 212 is fully available for R/W operations. The storage platter 246 is spinning at a high speed and the slider 264 may be parked in anticipation of an incoming R/W operation or flying above the storage platter 246 during R/W operations.

Idle mode is used when the HDD 212 is powered-on and expected to be soon used in R/W operations. As such, the storage platter 246 is spinning at a low speed and the slider 264 may be parked or flying above the storage platter 246. Accordingly, the idle mode has a higher power consumption than standby mode but is able to more quickly increase storage platter 246 speed to that of active mode to execute incoming R/W operations. Further, the idle mode has a lower power consumption than the active mode, as the VCM operating at the platter spindle 258 consumes less power rotating the storage platter 246 at the low speed of idle mode as compared to the high speed of active mode. Power consumption savings is balanced against time to transition from idle mode to active mode in selecting an appropriate storage platter 246 rotation speed for idle mode.

High-speed rotation of the storage platter 246 (also referred to herein as spindle speed) is defined herein as any speed at which the HDD 212 can execute R/W operations on the storage platter 246 (e.g., 7200 rotations per minute (RPM)). Low-speed rotation of the storage platter 246 is defined herein as any speed equal to 10%-90% of the high-speed rotation of the storage platter 246, depending on a target balance between power consumption savings and time to transition from idle mode to active mode.

In an example implementation, 5400 RPM is selected as a target spindle speed when operating in idle mode. A selection range, such as +/−5%, is chosen based on the target spindle speed, which results in a selection range equaling 5130 RPM to 5670 RPM. In other implementations, different ranges may be chosen to define the selection range (e.g., +/−10%, +/−20%, +/−500 RPM, +/−1000 RPM, and so on). A specific spindle speed is selected for idle mode for HDD 212 within the selection range.

In some implementations, the servo controller 271 is step-size limited, which limits the target spindle speeds that are available within the selection range (e.g., with a step-size of 9 RPM and a selection range equaling 5130 RPM to 5670 RPM, available target spindle speeds are 5130, 5139, 5148 . . . , 5661, and 5670). Step-sizes other than 9 RPM are contemplated herein and may be limited by the servo controller 271 design or practicality in limiting the number of available target spindle speeds within the selection range. In some implementations, idle spindle speeds that are different as used herein vary by at least one step-size. In other implementations, idle spindle speeds that are different as used herein vary by at least 10%.

In some implementations, the specific spindle speed within the selection range is randomly selected and permanently written in the firmware 244 at a point of origin or manufacturing for the HDD 212, or during commissioning of the HDD 212 and cannot be later changed. In other implementations, a default spindle speed within the selection range (e.g., 5400 RPM) is written in the firmware 244 at the point of origin or manufacturing for the HDD 212, or during commissioning of the HDD 212. When the HDD 212 is placed in service, potentially within a disc array (e.g., disc array 102 of FIG. 1) and/or a data storage rack (e.g., data storage rack 100 of FIG. 1), a new specific spindle speed within the selection range is randomly selected and written in the firmware 244. In implementations where the specific spindle speed is selected after the HDD 212 is included within a disc array and/or data storage rack, the specific spindle speed may be selected so that it is not shared with other specific spindle speeds selected for other HDDs within the same disc array and/or data storage rack.

Further, in some implementations, the specific spindle speeds are chosen within the selection range to avoid vibrations at multiple frequencies within a harmonic series (the spindle speeds are members of different harmonic series). For example, specific spindle speeds are chosen to avoid the lower harmonics (e.g., magnitudes that primarily depend on disc stack imbalance and misalignment, such as 1×, 2×, 3× . . . ) and higher harmonics (e.g., magnitudes that primarily depend on the spindle electromagnet, such as 24×, 36×, . . . ). Specifically, if HDD 212 vibrates at 90 Hz when its specific spindle speed is set at 5400 RPM, other specific spindle speeds for other HDDs within a disc array and/or data storage rack are avoided that yield harmonic vibration at 180 Hz and 270 Hz, as well as 2160 Hz and 3240 Hz, and so on. In other implementations, specific spindle speeds for HDDs within a disc array and/or data storage rack may be specifically chosen to cancel previously dominant vibration frequencies.

As a result, no particular vibration frequency will dominate at the data storage rack level, although there may be hundreds of HDDs spinning concurrently within the data storage rack. Randomizing the specific spindle speed for idle mode is able to minimize a magnitude of data storage rack vibration and PDT noise. Further, randomizing the specific spindle speed for idle mode reduces the impact of mechanical vibrations on the HDDs operated in active mode for R/W operations.

In various implementations, there may be two or more storage platters stacked and rotating together about the platter spindle 258. In such implementations, an actuator arm and its respective slider may be assigned to each of the stacked storage platters. For example, the actuator arm 248 and its respective slider 264 may read data from and/or write data to the storage platter 246, while another actuator arm and its respective slider may read data from and/or write data to another storage platter (not shown) stacked above or below the storage platter 246. In still further implementations, the HDD 212 includes a stacked array of any number of storage platters, each of which has an arm and a respective slider as described herein assigned to one or both surfaces (i.e., top and bottom surfaces) of the storage platters.

Appearances of the storage platter 246, actuator arm 248, and other features of the HDD 212 are for illustration purposes only and the features are not drawn to scale. The various microelectronic components attached to the slider 264 may be referred to in total as a transducer head. The presently disclosed technology may apply to rotating disc storage drive technologies other than the magnetic domain HDD 212 depicted in FIG. 2 (e.g., optical disc drives).

Figure 3:
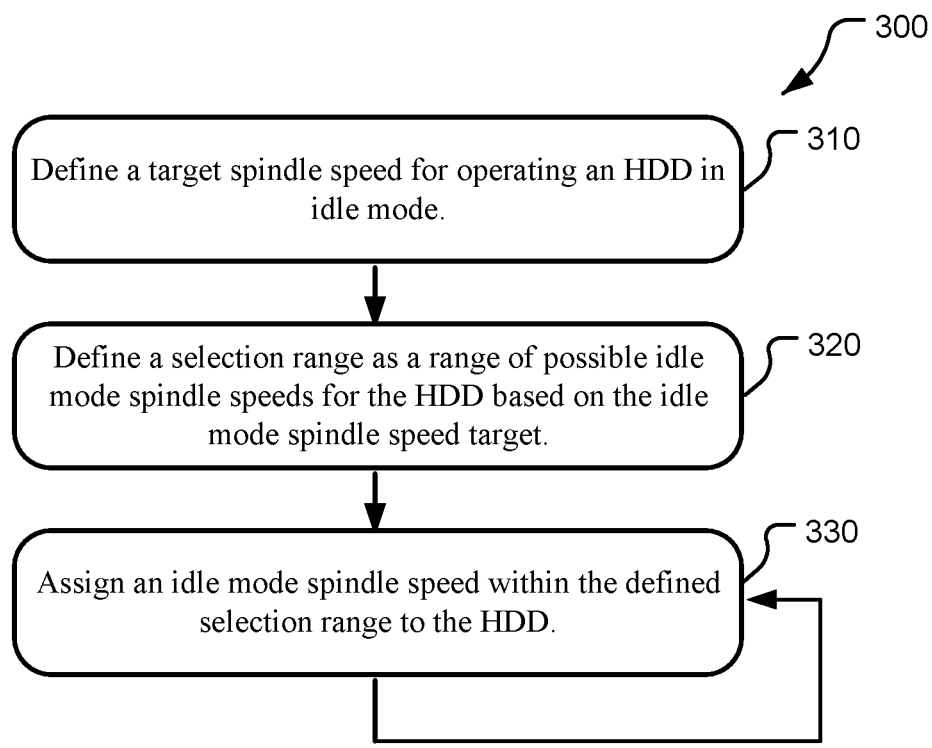
FIG. 3 illustrates example operations for programming firmware for a hard disc drive (HDD) with an idle spindle speed selected from multiple options within a selection range.

FIG. 3 illustrates example operations 300 for programming firmware for a hard disc drive (HDD) with an idle spindle speed selected from multiple options within a selection range. A defining operation 310 defines a target spindle speed for operating in idle mode (or an idle mode spindle speed target). Active mode rotation of a storage platter (also referred to herein as spindle speed) is any speed at which an HDD can execute R/W operations on the storage platter (e.g., 7200 RPM). Idle mode rotation of the storage platter is any speed equal to 10%-90% of the active mode rotation of the storage platter, depending on a target balance between power consumption savings and time to transition from idle mode to active mode (e.g., 5400 RPM).

A defining operation 320 defines a selection range as a range of possible idle mode spindle speeds based on the idle mode spindle speed target. The selection range, such as +/−5%, is based on the idle mode spindle speed target. In other implementations, different ranges may be chosen to define the selection range. In some implementations, the selection range is step-size limited, which limits the target spindle speeds that are available within the selection range.

An assigning operation 330 assigns an idle mode spindle speed within the defined selection range to the HDD. The assigning operation 330 may randomly select the idle mode spindle speed and write the selected idle mode spindle speed to the HDD's firmware. In some implementations, the assigning operation 330 is not entirely random as it may be adapted to avoid harmonics within a harmonic series or HDDs with the same idle mode spindle speed within a disc array or a data storage rack. The assigning operation 330 may be iteratively repeated to assign further idle mode spindle speeds for further HDDs and write the selected idle mode spindle speeds to the HDDs' firmware.

Figure 4:
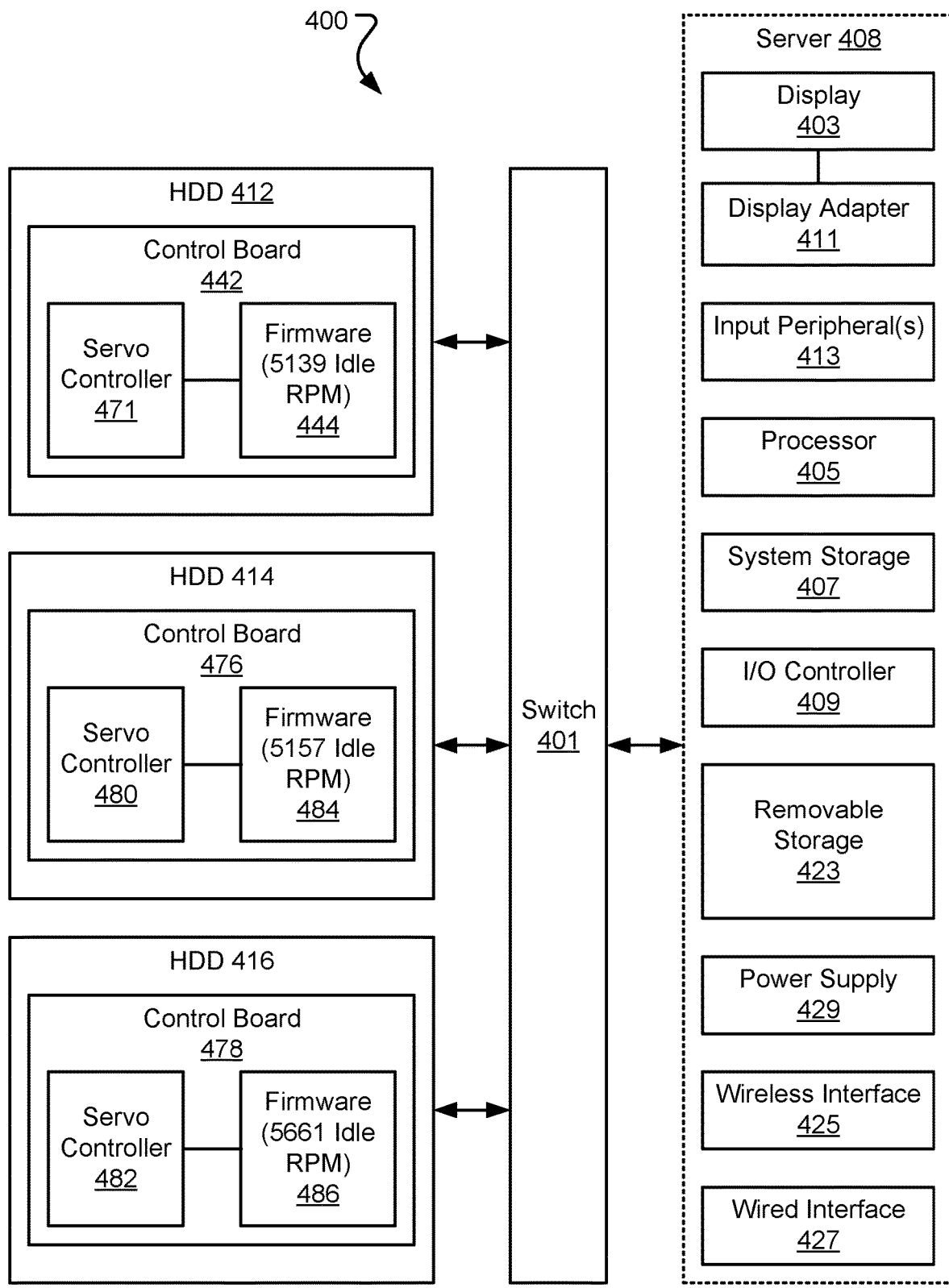
FIG. 4 illustrates an example system diagram of a computing system suitable for accessing an array of hard disc drives (HDDs) operating at variable idle spindle speeds.

FIG. 4 illustrates an example system diagram of a computing system 400 implemented on a data storage rack suitable for accessing an array of hard disc drives (HDDs) 412, 414, 416 operating at variable idle speeds. The HDDs 412, 414, 416 each include control boards 442, 476, 478, respectively. Each of the control boards 442, 476, 478 include servo controllers 471, 480, 482 and firmware 444, 484, 486, respectively. The HDDs 412, 414, 416 each further include a series of storage media platters (e.g., storage media platter 246 of FIG. 2), each of which is accessible via the servo controllers 471, 480, 482, respectively. The firmware 444, 484, 486 for each of the HDDs 412, 414, 416, respectively, stores assigned spindle speeds for active mode and idle mode operation. While the active mode spindle speeds may be common across all of the HDDs 412, 414, 416, the idle mode spindle speeds vary within a defined selection range (here, 5130 RPM to 5670 RPM, resulting in randomly selected spindle speeds of 5139, 5157, and 5661 for HDDs 412, 414, 416, respectively).

Server 408 manages access to the HDDs 412, 414, 416 via a data storage rack switch 401, which interconnects IT components within the data storage rack. The server 408 includes major subsystems such as a processor 405, system storage 407 (such as random-access memory (RAM) and read-only memory (ROM)), an input/output (I/O) controller 409, removable storage (such as a memory card) 423, a power supply 429, and external devices such as a display screen 403 via a display adapter 411, and various input peripherals 413 (e.g., a mouse, trackpad, keyboard, touch-screen, joystick, and/or smart card acceptance device). Wireless interface 425 together with a wired network interface 427, may be used to interface to the data storage rack, a data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 4 to be present to practice the presently disclosed technology. Furthermore, devices and components thereof may be interconnected in different ways from that shown in FIG. 4. Code (e.g., computer software, including mobile applications (apps) to implement the presently disclosed technology may be operably disposed in the HDDs 412, 414, 416, the system storage 407, and/or the removable storage 423.

The computing system 400 may include a variety of tangible computer-readable storage media (e.g., the HDDs 412, 414, 416, the system storage 407, and/or the removable storage 423) and intangible computer-readable communication signals. Tangible computer-readable storage can be embodied by any available media that can be accessed by the computing system 400 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information and which can be accessed by the computing system 400.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A disc array comprising:
a first hard disc drive (HDD) to selectively operate at one of a first active mode spindle speed and a first idle mode spindle speed lower than the first active mode spindle speed; and
a second HDD to selectively operate at one of a second active mode spindle speed and a second idle mode spindle speed lower than the second active mode spindle speed, wherein the first idle mode spindle speed is different from the second idle mode spindle speed.

2. The disc array of claim 1, wherein:
the first HDD includes first HDD firmware storing the first active mode spindle speed and the first idle mode spindle speed; and
the second HDD includes second HDD firmware storing the second active mode spindle speed and the second idle mode spindle speed.

3. The disc array of claim 2, wherein:
the first HDD includes a first HDD control board to read the first HDD firmware and select one of the first active mode spindle speed and the first idle mode spindle speed for operation of the first HDD; and
the second HDD includes a second HDD control board to read the second HDD firmware and select one of the second active mode spindle speed and the second idle mode spindle speed for operation of the second HDD.

4. The disc array of claim 1, wherein:
the first HDD operates in an active mode at the first active mode spindle speed where the first HDD is capable of read and write operations; and
the second HDD operates in the active mode at the second active mode spindle speed where the second HDD is capable of read and write operation.

5. The disc array of claim 4, wherein:
the first HDD operates in an idle mode at the first idle mode spindle speed where the first HDD is not capable of read and write operations; and
the second HDD operates in the idle mode at the second idle mode spindle speed where the second HDD is not capable of read and write operations.

6. The disc array of claim 5, further comprising:
cache memory shared between the first HDD and the second HDD for one or both of incoming data to the disc array and outgoing data from the disc array.

7. The disc array of claim 6, wherein one or both of the first HDD and the second HDD operate in the active mode when it is one or both of a recipient of the incoming data to the disc array and a source of the outgoing data from the disc array.

8. The disc array of claim 1, wherein both the first idle mode spindle speed and the second idle mode spindle speed are lower than the both the first active mode spindle speed and the second active mode spindle speed.

9. The disc array of claim 1, wherein the first active mode spindle speed and the second active mode spindle speed are equal.

10. The disc array of claim 1, wherein the first idle mode spindle speed varies from the second idle mode spindle speed by at least 10%.

11. The disc array of claim 1, wherein the first idle mode spindle speed and the second idle mode spindle speed lie within 5130 to 5670 rotations per minute.

12. The disc array of claim 1, wherein the first idle mode spindle speed and the second idle mode spindle speed are members of different harmonic series.

13. A method of defining idle mode spindle speeds for a disc array comprising:
- assigning a first idle mode spindle speed lower than a first active mode spindle speed within a selection range to a first hard disc drive (HDD); and
- assigning a second idle mode spindle speed lower than a second active mode spindle speed within the selection range to a second HDD, wherein the first idle mode spindle speed is different from the second idle mode spindle speed.

14. The method of defining idle mode spindle speeds of claim 13, further comprising:
- defining an idle mode spindle speed target; and
- defining the selection range as a range of possible idle mode spindle speeds based on the idle mode spindle speed target.

15. A data storage rack comprising:
- a first disc array including:
  - a first hard disc drive (HDD) to selectively operate at one of a first active mode spindle speed and a first idle mode spindle speed;
  - a second HDD to selectively operate at one of a second active mode spindle speed and a second idle mode spindle speed; and
- a second disc array including:
  - a third HDD to selectively operate at one of a third active mode spindle speed and a third idle mode spindle speed; and
  - a fourth HDD to selectively operate at one of a fourth active mode spindle speed and a fourth idle mode spindle speed, wherein the first, second, third, and fourth idle mode spindle speeds are different.

16. The data storage rack of claim 15, wherein:
- the first HDD includes first HDD firmware storing the first active mode spindle speed and the first idle mode spindle speed;
- the second HDD includes second HDD firmware storing the second active mode spindle speed and the second idle mode spindle speed;
- the third HDD includes third HDD firmware storing the third active mode spindle speed and the third idle mode spindle speed; and
- the fourth HDD includes fourth HDD firmware storing the fourth active mode spindle speed and the fourth idle mode spindle speed.

17. The data storage rack of claim 16, wherein:
- the first HDD includes a first HDD control board to read the first HDD firmware and select one of the first active mode spindle speed and the first idle mode spindle speed for operation of the first HDD;
- the second HDD includes a second HDD control board to read the second HDD firmware and select one of the second active mode spindle speed and the second idle mode spindle speed for operation of the second HDD;
- the third HDD includes a third HDD control board to read the third HDD firmware and select one of the third active mode spindle speed and the third idle mode spindle speed for operation of the third HDD; and
- the fourth HDD includes a fourth HDD control board to read the fourth HDD firmware and select one of the fourth active mode spindle speed and the fourth idle mode spindle speed for operation of the fourth HDD.

18. The data storage rack of claim 15, wherein:
- the first HDD operates in an active mode at the first active mode spindle speed where the first HDD is capable of read and write operations;
- the second HDD operates in the active mode at the second active mode spindle speed where the second HDD is capable of read and write operation;
- the third HDD operates in an active mode at the third active mode spindle speed where the third HDD is capable of read and write operations; and
- the fourth HDD operates in the active mode at the fourth active mode spindle speed where the fourth HDD is capable of read and write operation.

19. The data storage rack of claim 18, wherein:
- the first HDD operates in an idle mode at the first idle mode spindle speed where the first HDD is not capable of read and write operations;
- the second HDD operates in the idle mode at the second idle mode spindle speed where the second HDD is not capable of read and write operations;
- the third HDD operates in an idle mode at the third idle mode spindle speed where the third HDD is not capable of read and write operations; and
- the fourth HDD operates in the idle mode at the fourth idle mode spindle speed where the fourth HDD is not capable of read and write operations.

20. The data storage rack of claim 19, further comprising:
- a first cache memory shared between the first HDD and the second HDD for one or both of incoming data to the disc array and outgoing data from the first disc array; and
- a second cache memory shared between the third HDD and the fourth HDD for one or both of incoming data to the disc array and outgoing data from the second disc array.

* * * * *